H. M. PEAVEY.
Potato-Digger.

No. 56,260

Patented July 10, 1866

Witnesses.
Samuel N. Piper.
George Andrews.

Inventor.
Hollis M. Peavy
by his Atty
R. H. Eddy.

UNITED STATES PATENT OFFICE.

HOLLIS M. PEAVEY, OF SWANVILLE, MAINE.

IMPROVEMENT IN MACHINES FOR DIGGING POTATOES.

Specification forming part of Letters Patent No. 56,260, dated July 10, 1866.

*To all whom it may concern:*

Be it known that I, HOLLIS M. PEAVEY, of Swanville, in the county of Waldo and State of Maine, have invented an Improved Machine for Digging Potatoes; and I do hereby declare the same to be fully described in the following specification and represented in the accompanying drawings, of which—

Figure 1:
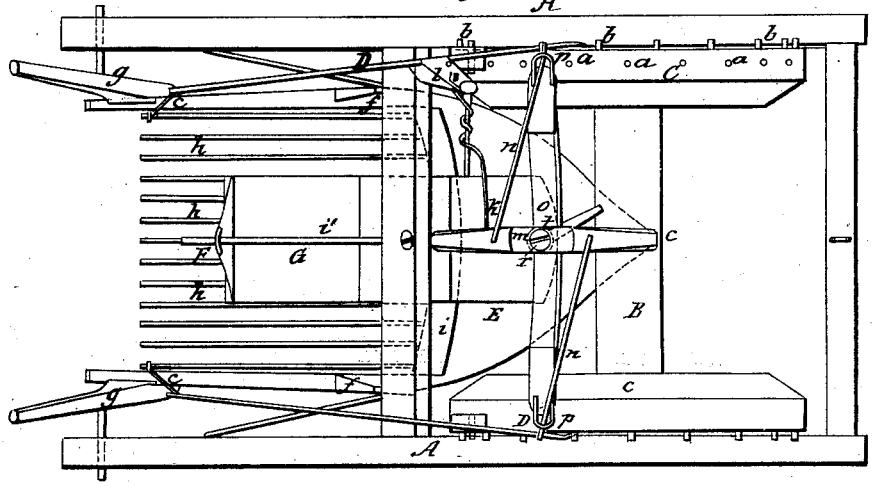
Figure 2:
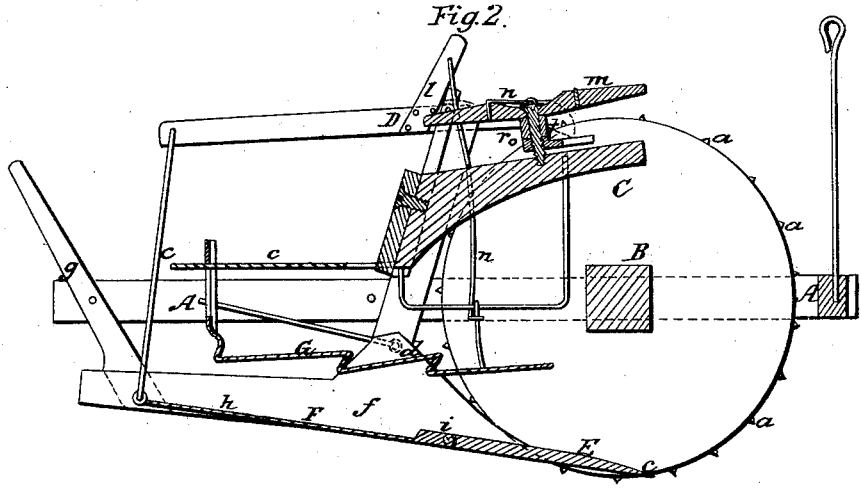

Figure 1 is a top view, and Fig. 2 a longitudinal and vertical section, of it.

In the drawings, A denotes a frame supported by an axle, B, carrying two wheels, C C, arranged as shown in Fig. 1. Each or either of the wheels may have teeth $a$ $a$ extending from its periphery. Each of such wheels should also have a series of teeth, $b$ $b$ $b$, projecting from its outer side, and arranged at equal distances apart on the circumference of a circle, and near the circumference of the wheel.

The smaller arm of one of two levers, D D, is arranged over each set of teeth $b$ $b$ $b$, and should be so formed that during the revolution of the wheel a vibratory motion shall be imparted to the lever on its fulcrum, so as to give quick vertical movements to a separator, F, applied to a scoop, E. Such lever is connected with one of the rods of the separator by a connecting-rod, $c$. The said scoop is arranged in rear of and between the wheels, and is so applied to the frame A as to be capable of turning on journals as a lever turns on its fulcrum, one of such journals being arranged at $d$. (See Fig. 2.)

The front of the scoop has an angular or pointed nose, $e$, to cause the scoop to enter the ground and pass below the potatoes when thereon. This nose is supported by two arms, $f f$, which extend back from it, and have handle-bars $g$ $g$ projecting from them, as shown in the drawings.

Between the levers of the scoop there is a series of rods, $h$ $h$ $h$, extending from a head, $i$, hinged to the scoop, these rods being arranged at equal distances apart. They constitute a means of separating from the potatoes raised by the scoop any earth which may adhere to them, which the rods will do in consequence of a quick vibratory motion being imparted to them while the machine is in the act of being moved over the surface of a potato-field.

A compound hoe, G, formed of a plate of metal bent in the shape represented in the drawings, is placed over the separator F, and is supported by and so as to be capable of being slid back and forth on a rod, $i'$, arranged as seen in Fig. 2. A vibrating or back-and-forth movement is to be given to this hoe while the machine may be in use. This may be accomplised by a lever, $k$, jointed to an arm, $l$, projecting from the longer arm of one of the levers D D.

The plate G, constituting the compound hoe, by being bent in the form shown in Fig. 2 becomes converted into a series of hoes or angular projections, which, on being moved back and forth over the separator F, will spread the earth and potatoes thereon and aid in their separation, and cause the potatoes to be pushed off and discharged from the separator.

In order to throw the levers D D out of action with the wheels, a lever, $m$, connected with the two levers D D by rods $n$ $n$, is supported on a yoke, $o$, the rods $n$ $n$ going through staples or eyes $p$ $p$ at the ends of such yoke. A screw-bolt, $r$, goes down through the lever $m$ and the yoke $o$, and constitutes the fulcrum of the lever $m$. This bolt screws into and projects upward from a stationary arm, $s$, arranged as shown in the drawings. A nut, $t$, provided with a handle extending from it, is screwed on the screw of the bolt and up against the yoke, and serves to clamp the lever $m$ in position when the levers D D are either in or out of engagement with the wheels.

In using the machine it is to be drawn along the surface of a potato-field so as to cause the scoop to enter the earth and raise it with the potatoes, a person in rear of the machine having hold of the handles of the scoops, and directing it thereby, so as to cause it to properly enter the ground. While going over the land a vibratory motion will be imparted to the separator, and the compound hoe will also be moved back and forth over the separator, the result being that the potatoes will be raised out of the ground, and the loose earth will be separated from them, and they will be discharged upon the surface of the field ready to be gathered.

Whenever it may be desirable to move the machine along, without at the same time putting the scoop, the separator, and the compound hoe in operation, we have only to unclamp the lever m and move it so as to throw the levers D D out of action with the wheels.

I lay no claim to the scoop and vibratory separator applied to a wheel-carriage and provided with mechanism for operating the said separator, as described.

What I claim as my invention is—

The combination, as well as the arrangement, of the compound hoe G and its operative mechanism with the scoop E and the vibratory separator F, applied to a wheel-carriage and provided with mechanism for operating the said separator, as explained.

HOLLIS M. PEAVEY.

Witnesses:
F. CURTIS,
F. P. HALE, Jr.